United States Patent
Dolega et al.

(10) Patent No.: US 10,387,189 B2
(45) Date of Patent: Aug. 20, 2019

(54) DISCOVERING AND IDENTIFYING RESOURCE DEPENDENCIES

(71) Applicant: INTERNATIONAL BUSINESS MACHINES CORPORATION, Armonk, NY (US)

(72) Inventors: Jacek Dolega, Cracow (PL); Andrzej W. Laskawiec, Cracow (PL); Marcin Luczynski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 572 days.

(21) Appl. No.: 14/947,251

(22) Filed: Nov. 20, 2015

(65) Prior Publication Data
US 2016/0149833 A1    May 26, 2016

(30) Foreign Application Priority Data
Nov. 21, 2014 (GB) .................................. 1420693.2

(51) Int. Cl.
  *G06F 8/71* (2018.01)
  *G06F 9/46* (2006.01)
(52) U.S. Cl.
  CPC . *G06F 9/46* (2013.01); *G06F 8/71* (2013.01)
(58) Field of Classification Search
  CPC .................................... G06F 9/46; G06F 8/71
  USPC .................................. 709/226; 370/315, 351
  See application file for complete search history.

(56) References Cited

U.S. PATENT DOCUMENTS

| | | | |
|---|---|---|---|
| 8,356,053 B2 | 1/2013 | Murthy et al. | |
| 8,712,973 B2 | 4/2014 | Ramachandran | |
| 8,782,079 B2 | 7/2014 | Matsubara et al. | |
| 2008/0175222 A1* | 7/2008 | Barnea | H04L 29/12594 370/351 |
| 2009/0210481 A1* | 8/2009 | Fletcher | G06F 17/3089 709/203 |
| 2012/0096163 A1* | 4/2012 | Tai | H04L 41/0856 709/226 |

(Continued)

OTHER PUBLICATIONS

Berners-Lee, RFC 3986—Uniform Resource Identifier (URI) Generic Syntax, Jan. 2005, The Internet Society, https://tools.ietf.org/html/rfc3986.*

(Continued)

*Primary Examiner* — David R Lazaro
*Assistant Examiner* — Zi Ye
(74) *Attorney, Agent, or Firm* — Alexander G. Jochym, Esq.; Kevin P. Radigan, Esq.; Heslin Rothenberg Farley & Mesiti P.C.

(57) ABSTRACT

Discovering and identifying resource dependencies. Resources are discovered and managed as configuration items, wherein selected configuration items are each assigned a Uniform Resource Identifier (URI) object. The assigned URI-objects are included in configuration data structures. The configuration data structures are stored in a configuration management system. A resource accessor address and an access point address are assigned. Further, an access resolve entry object is provided that provides a function for address translations, wherein the access resolve entry object includes at least a part of the resource accessor address and at least a part of the access point address, each of them in the URI-object form.

20 Claims, 8 Drawing Sheets

(56) References Cited

U.S. PATENT DOCUMENTS

2013/0046739 A1    2/2013  Waschke et al.
2013/0212215 A1*   8/2013  Ukkola .................. H04L 67/02
                                                    709/217
2014/0025647 A1    1/2014  Rangarajan et al.
2014/0143211 A1    5/2014  Baker et al.

OTHER PUBLICATIONS

BMC Software, "BMC Atrium Discovery and Dependency Mapping Explained," (no date information available), pp. 1-28.
Johnson, Arnold et al., "Guide for Security-Focused Configuration Management of Information Systems," NIST Special Publication 800-128, Aug. 2011, pp. 1-88.
Symantec, "Tracking the Associations of a Configuration Item," Dec. 20, 2011, pp. 1-12.

* cited by examiner

DISCOVERING AND IDENTIFYING RESOURCE DEPENDENCIES

PRIOR FOREIGN APPLICATION

This application claims priority from United Kingdom (GB) patent application number 1420693.2, filed Nov. 21, 2014, which is hereby incorporated herein by reference in its entirety.

BACKGROUND

One or more aspects of the invention relate generally to discovering and identifying resource dependencies.

In the IT environment, resources that are part of the environment—e.g., physical computer systems, virtual computer systems, network hardware like switches or applications, software application and/or appliances—referred together as "IT resources", are typically related through a net of dependencies, resulting from configuration settings and as such are subject to change (typically by human factors). These dependencies are required to be constantly identified, tracked and controlled.

Typically, information about dependencies between IT resources are stored in Configuration Management Database (CMDB) systems as dependencies between Configuration Items (CIs) being representations of the IT resources from the configuration perspective.

A problem with identifying which two CIs are related through a configuration dependency of some type typically consists of two parts: One is related to finding and understanding the configuration of the resource, meaning the ability to discover the resource, read and parse configuration settings and store them in a CMDB as CIs. The second part is related to the ability to detect from the CI's configurations that two or more CIs have a dependency as a result of their configurations, especially in cases where there are 'proxy' CIs involved in translation of configurations between a dependency target and source. Such 'proxies' may, e.g., be devices translating IP (Internet Protocol) addresses to a DNS (Domain Name Server) address, load-balancers, etc.

Typical solutions to the described problem are based on handling each configuration by specialized, proprietary code strictly tied with a given communication protocol stack, e.g., code being able to understand JDBC (Java Database Connectivity) based dependencies is parsing JDBC connectivity information of an accessing CI's configuration (e.g., a Java application), then trying to match that to RDBMS (relational database management system) servers information—typically a listening interface and ports—and databases available on that server. If a load-balancer is present between a database accessor and an RDBMS server, there is a need to extend the described logic with load balancer aware code which may be based on the load-balancer's configuration which may allow a correlation of connectivity information from the accessor with the RDBMS configuration. There may be multiple types of load balancer's configurations because, typically, the configurations are vendor-specific. Moreover, multiple types of load-balancing techniques exist. The same may apply to configuration settings of different RDBMS vendors and/or multiple configurations of elements (CIs) accessing the databases exposed by the RDBMS.

Thus, such an approach requires separate handling for each accessor type, proxy elements between accessor and accessed CIs, making that solution very hard to extend and maintain.

SUMMARY

Shortcomings of the prior art are overcome and additional advantages are provided through the provision of a method of discovering and identifying resource dependencies. The method includes discovering resources in a computing center and managing the resources as configuration items, wherein selected configuration items are each assigned a Uniform Resource Identifier (URI)-object; including the assigned URI-objects of the selected configuration items in configuration data structures of the related configuration items, and storing the configuration data structures in a configuration management system; assigning a resource accessor address in a form of a URI-object to a configuration item of a resource accessor, wherein the resource accessor address defines an address in the form of a URI-object of a resource to be accessed; assigning an access point address in the form of a URI object to a configuration item of an access point, wherein the access point address defines an address in the form of a URI-object of the resource to be accessed; and providing an access resolve entry object providing a function for address translation, wherein the access resolve entry object comprises at least a part of the resource accessor address and at least a part of the access point address, each of them in the URI-object form.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the invention will now be described, by way of example only, and with reference to the following drawings.

DETAILED DESCRIPTION

There are several disclosures related to discovering and identifying resource dependencies. For instance, a configuration information management device is disclosed that includes a storage unit for storing a configuration item and an item relationship. The configuration information management device controls the storage unit or a different configuration information management device to store the item relationship. The configuration information management device also controls the storage unit or the different configuration information management device containing a configuration item connected to the item relationship to store a replica of the item relationship.

Further, managing relationships between resources stored in a repository is described. A client sends, to a server, a request to store a first resource within a repository. In response to receiving the request, the server parses the first resource to retrieve relationship data that identifies the relationship between two or more resources to be stored, or currently stored, within the repository.

However, the problem remains that code that maintains interfaces and protocols is specific to configuration items resulting in management problems and extensibility of such solutions.

Thus, in accordance with aspects of the present invention, a method for discovering and identifying resource dependencies, a configuration item dependency generator, a computing system, a data processing program, and a computer program product, are provided.

In the context of this description, the following conventions, terms and/or expressions may be used:

The term "resource" may denote any resource to be managed in a data center. This may include computer systems and parts thereof, network devices, applications like middleware components, software applications, databases, mobile devices, telephones, appliances, power supplies and elements from a facility management system, and the like.

The term "configuration item"—or in short CI—may refer to a fundamental structural unit of a configuration management system, e.g., a CMDB. Examples of CIs may include individual requirement documents, software, models, and plans. The configuration management system may oversee the lifecycle of the CIs through a combination of process and tools by implementing and enabling the fundamental elements of identification, change management, status accounting, and audits. The objective of this system is to avoid the introduction of errors related to lack of testing as well as incompatibilities with other CIs. The term configuration item may be applied to anything designated for the application of the elements of configuration management and treated as a single entity in the configuration management system. The entity should be uniquely identified so that it can be distinguished from all other configuration items.

The term "dependency"—in particular a dependency between resources in a data center—may denote direct relationships between CIs managed in a data center, wherein the existence or a specific configuration of one of two involved resources may be a prerequisite for a proper function of the second resource.

The term "Uniform Resource Identifier object" or "URI-object" may denote a string of characters used for identifying a name of a resource. Such identification enables interaction with representations of the resource over a network, e.g., the World Wide Web or local area network, using specific protocols. Schemes specifying a concrete syntax and associated protocols may define each URI. The most common form of a URI is the uniform resource locator (URL), frequently referred to informally as a web address.

The term "configuration data structure" may denote a data structure related to a CI and describing specific characteristics of the CI.

The term "configuration management system" may denote a software and/or a hardware system or a combination thereof for management of configurations of resources (see above). Each resource may have a related CI data structure accessed by the configuration management system. The CI data structure may be stored in a configuration management system database, i.e., a CMDB.

The term "access point address" may denote an address directly related to an access point, e.g. in the form of a URI, wherein the access point may be a resource to be accessed by another resource. An example may be an application (=resource accessor) accessing a database (=access point). The access point may also be seen as a service delivering entity, e.g., a server to a client. In this case, the client may be the resource accessor.

The term "resource accessor address" may denote an address to be accessed seen from the resource accessor side. In other words, a resource accessor address may not be the address of the accessor, but an address of a resource that the accessor may request a service from. In case of the example above (application/database), the application may be the resource accessor and the related resource accessor address may be the address of the object that may be accessed or, a service may be requested from.

In a simple case, the resource accessor address may be identical to the access point address if a direct relationship or dependency may be defined between the resource accessor and the access point.

In accordance with one or more aspects, the discovering and identifying of resource dependencies may offer the following, as examples:

Existing and discovered dependencies between resources may—in contrast to conventional technologies—be defined and managed as standardized, protocol independent representations of the dependency source and the dependency target configuration. A URI schema naming structure, i.e., a URI-object, in an already parsed form may be used instead of individual all proprietary naming structures.

Also, a standardized presentation of CIs with name translating configurations (aka as proxies), here, access resolve entries, may also be managed within the URI schema naming structure with extensions to the scheme allowing also wildcards which may also be stored using an URI-object.

Additionally, the method and related generator, in accordance with one or more aspects of the present invention, provide a protocol and connectivity mechanism agnostic method of querying access point, resource accessor and access resolve entry information in aim to connect CIs being referenced by an access point and a resource accessor.

Hence, the method and related generator may no longer require private all proprietary data structures, and instead, use URI objects with wildcards for an easy extension and easy cross vendor applicability.

According to one embodiment, the URI-object may be described according to RFC3986 of the Internet Engineering Task Force and wherein the URI-object allows unspecified elements of the URI-object. Such unspecified elements may be wildcards, e.g., "zeros" representing an "it-doesn't-matter-address".

According to a further embodiment, information about a resource—or CI, respectively-available for access by a resource accessor may be extracted from the configuration data structure of a configuration item and converted into an access point address in a URI-form. Having the access point address in a URI-form may be a prerequisite for applying the proposed method.

According to a further embodiment, information about a resource—or CI, respectively—adapted for accessing another resource may be extracted from the configuration data structure of a related configuration item and converted into a resource accessor address in a URI-form. This may be a mirror process if compared to the treatment of the access point address. In case of this embodiment, the resource accessor address is converted to the URI-form.

According to an one embodiment, a set of the address resolution entry objects is linked to an access point address. This may allow for an address translation by an address translation service, e.g., a proxy or load balancer. It may also express that an access point may be accessed by different resource accessors.

According to one embodiment, the linking, mentioned in the preceding paragraph, of the address resolution entry objects to the access point address may further comprise that for each resource accessor address a matching URI-object may be searched in the set of access point addresses and the access resolve entry objects. This may be instrumental for resolving address translations and handling proxies. In this terminology, "a proxy" may not denote a proxy per se, as known from network devices, but also any other address translation service.

According to a further embodiment, the configuration item of the corresponding accessed resource may be obtained for each matching URI-object, if the matching URI-object represents an access point address and the configuration item of the accessing resource may be obtained. Additionally, a dependency, i.e., a dependency describing element, may be generated between the related configuration items. Thus, a dependency between resources may be instantiated.

The method may—according to again a further embodiment—comprise: if the matching URI-object may represent an access resolve entry object that may be accessed, the related access resolve entry object may be obtained; and a matching URI-object may be searched in the set of access point addresses and the access resolve entry objects. Additionally, the search result may be handled by continuing with a step as described in the preceding paragraph. Thus, in one example, all URI-objects may be treated in the same way and all dependencies may be discovered, stored in the CMDB and managed by the configuration management system.

In an embodiment, the resource accessor and/or the access point may each be selected out of the group comprising a hardware object, and a software object. Also a combination thereof may be possible, e.g., an appliance. Thus, potentially existing elements matched by a configuration management system using, e.g., a CMBD, may be addressed.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, e.g., between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which aspects of the invention are not limited.

In the following, a detailed description of the figures will be given. All instructions in the figures are schematic. Firstly, a block diagram of an embodiment of the method for discovering and identifying resource dependencies is given. Afterwards, further embodiments will be described.

Figure 1:
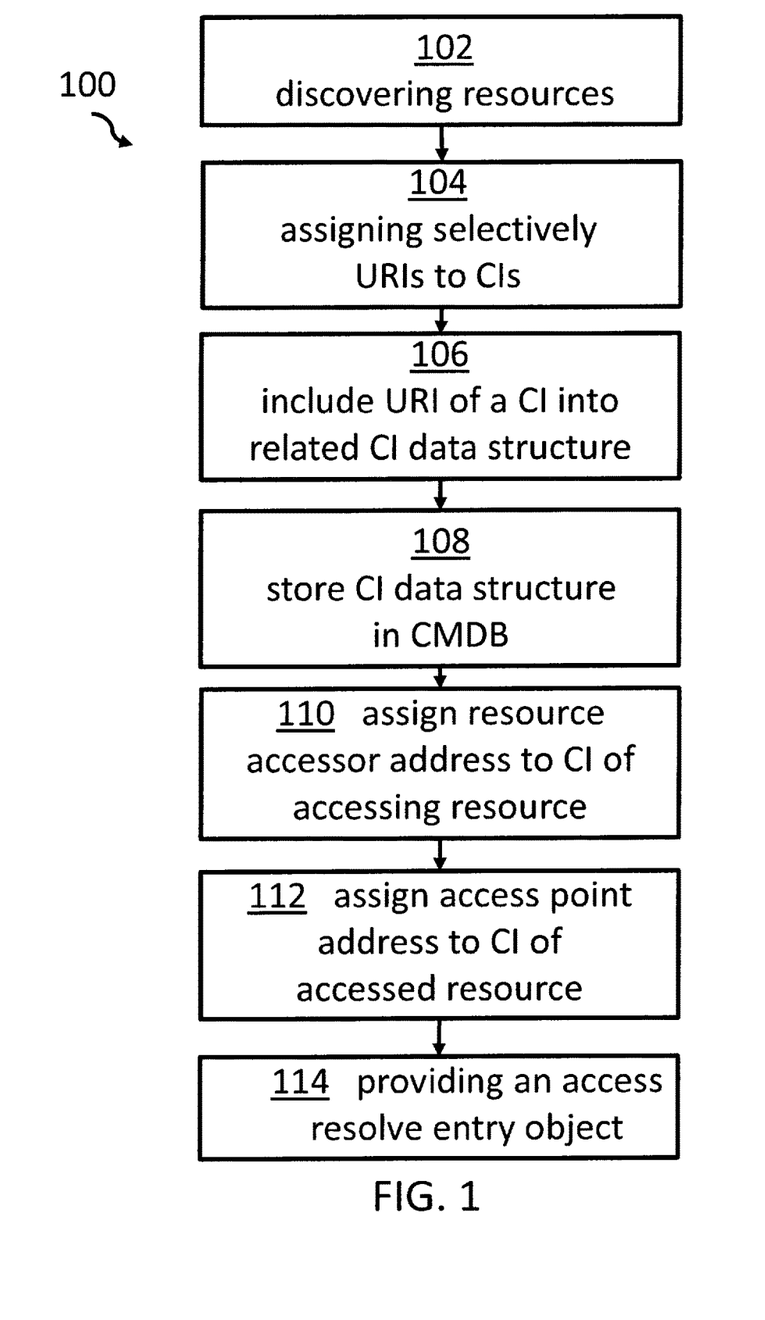
FIG. 1 shows a block diagram of an embodiment of the method, in accordance with an aspect of the present invention.

FIG. 1 shows a block diagram of an embodiment of a method 100 for discovering and identifying a resource. The method, as shown, comprises discovering, 102, resources in a computing center and managing them as configuration items. This initial step may be based on known technologies using a traditional systems management tool. Selected ones of the configuration items are each assigned, 104, a Uniform Resource Identifier object, i.e., they become a URI-object. The selection may be made in a way that only CIs that may be accessed, e.g., in general, any kind of server.

In a further step, the assigned URI-object of a configuration item is included, 106, in a configuration data structure of the related configuration item. This may be done for every CI for which a URI exists. Then, the configuration data structures are stored, 108, in a configuration management system, e.g., a CMDB.

Now, a resource accessor address—i.e., an address of the target object to be accessed as seen from the accessor/requestor—in form of a URI-object may be assigned, 110, to a configuration item of a resource accessor, wherein the resource accessor address defines an address in the form of a URI-object of a resource to be accessed.

As another step, an access point address—i.e., an address of the object targeted, as seen from the targeted object, service provider or server—in the form of a URI-object may be assigned, 112, to a configuration item of an access point. The access point address may define an address in the form of a URI-object of the resource to be accessed.

Furthermore, an access resolve entry object (basically, the table of example 1, compare FIG. 5) may be provided, 114, for providing a function for address translations. The access resolve entry object may comprise at least a part of the resource accessor address and at least a part of the access point address, each of them in URI-object form. The reason why only parts of the addresses may be present is that also wildcards may be allowed.

It may also be noted that the address translation may be more general than a pure DNS entry and/or a Routing Table entry.

Figure 2:
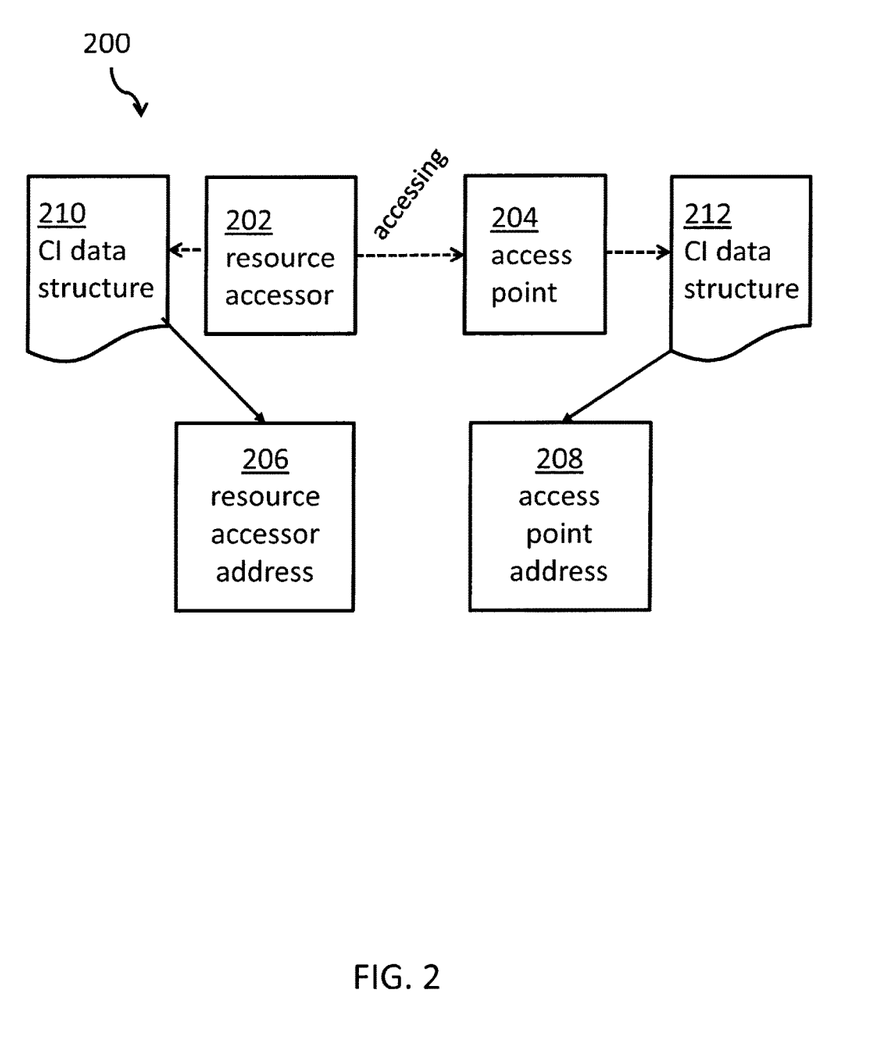
FIG. 2 shows a block diagram of an embodiment of involved objects in the method, in accordance with an aspect of the present invention.

FIG. 2 shows a block diagram 200 of involved objects in one embodiment of the method. The figure shows two resources: a resource accessor 202 and an access point 204 which may be accessed by the resource accessor 202. In this sense, the access point 204 may have the role of a server in the classical client-server-model. The resource accessor 202, which is a configuration item, may be represented by a CI data structure 210; and the access point 204, which is another configuration item, may be represented by the CI data structure 212. A part of the CI data structure 210 of the resource accessor 202 may be the resource accessor address 206 which, actually, may point directly to the access point address 208 which may be part of the CI data structure 212 representing the access point 204. Thus, in the simple case, the resource accessor address 206 and the access point address 208 are identical.

Figure 3:
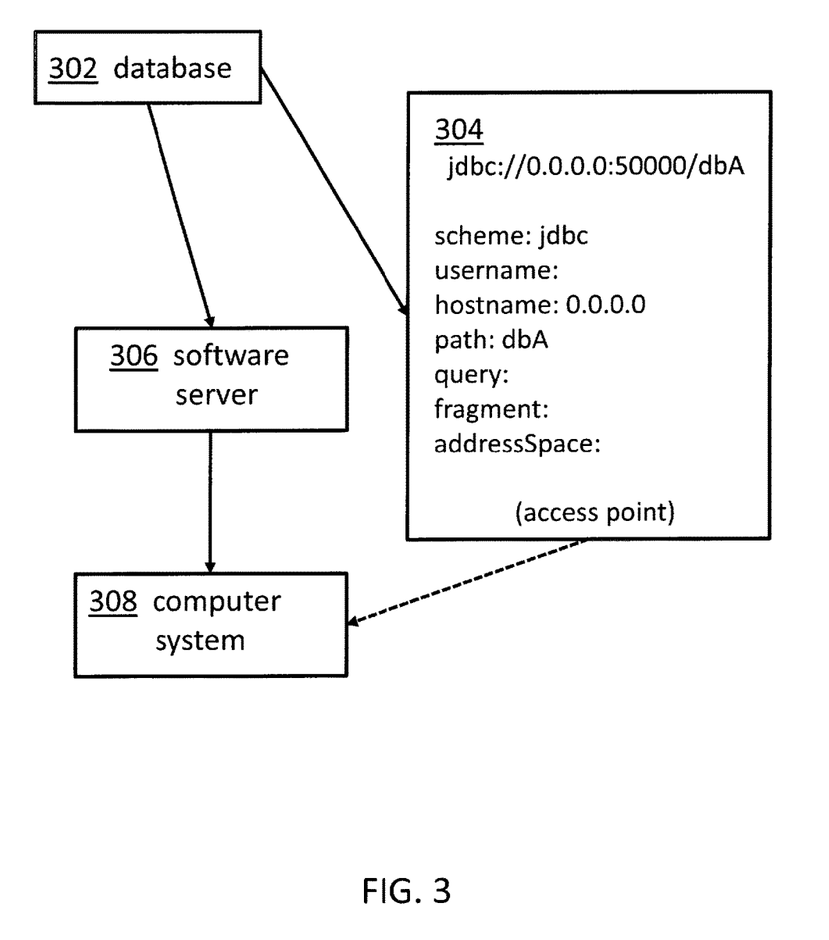
FIG. 3 shows an embodiment of an access point, a related URI-object and other depending resources, in accordance with an aspect of the present invention.

FIG. 3 shows—as an example—a database 302 which may be accessed. The database 302 may be accessed—and thus representing the access point 204 (compare FIG. 2)—via the URI-object 304 which comprises context information about the CI in question.

Typically, a URI-object may be described as the following data structure:

TABLE

| URI-object: | |
|---|---|
| scheme | string |
| username: | string |
| hostname: | string |
| port: | string |
| path: | string |
| query: | string |
| fragment: | string |
| addressSpace: | string |

Each element in the URI-object may be represented by a string of characters. However, for the examples described here, not every string needs to be present as a character sequence. In that case, this field may be interpreted as a wildcard or "it doesn't matter".

In the case of FIG. 3, the database 302 may be addressed by the URI-object jdbc://0.0.0.0:5000/dbA (ref.-num. 304). This may be interpreted as (access) scheme=jdbc, no username, host address=0.0.0.0 which means "it does not matter", the port number is 5000, the path is dbA, a query, a fragment and an addressSpace is not given.

With this, the elements in FIG. 3 may be interpreted as follows: The database 302 may be the deployed object, e.g., an accessed resource which may be accessed via the corresponding URI-object 304. The database 302 may run on a software server 306 which may be executed on a computer system 308.

In the simplest cases, by comparing access point address 208 and resource accessor address 206 (compare FIG. 2), it may be possible to match a CI representing a dependency target (referenced as access point 204) and a CI representing a dependency source (referenced as resource accessor 202). However, in non-trivial cases, information of an access point 204 and a resource accessor 202 (compare FIG. 2) may require additional information to be provided to the system to allow a proper matching of related accessing and accessed addresses.

That additional information, collected independently for the access point 204 and the resource accessor 202 by reading the related configurations, represented by the respective CI data structures 210 and 212, may be stored as an access resolve entry object (sometimes referred to as an ARE object) and may represent a CI proxy connection in the form of an access resolve entry table between the access point 204 and the resource accessor 202 (compare FIG. 2).

That access resolve entry table may consist of references to two URI table entries or resolve access entries: accessing and accessed.

Figure 4:
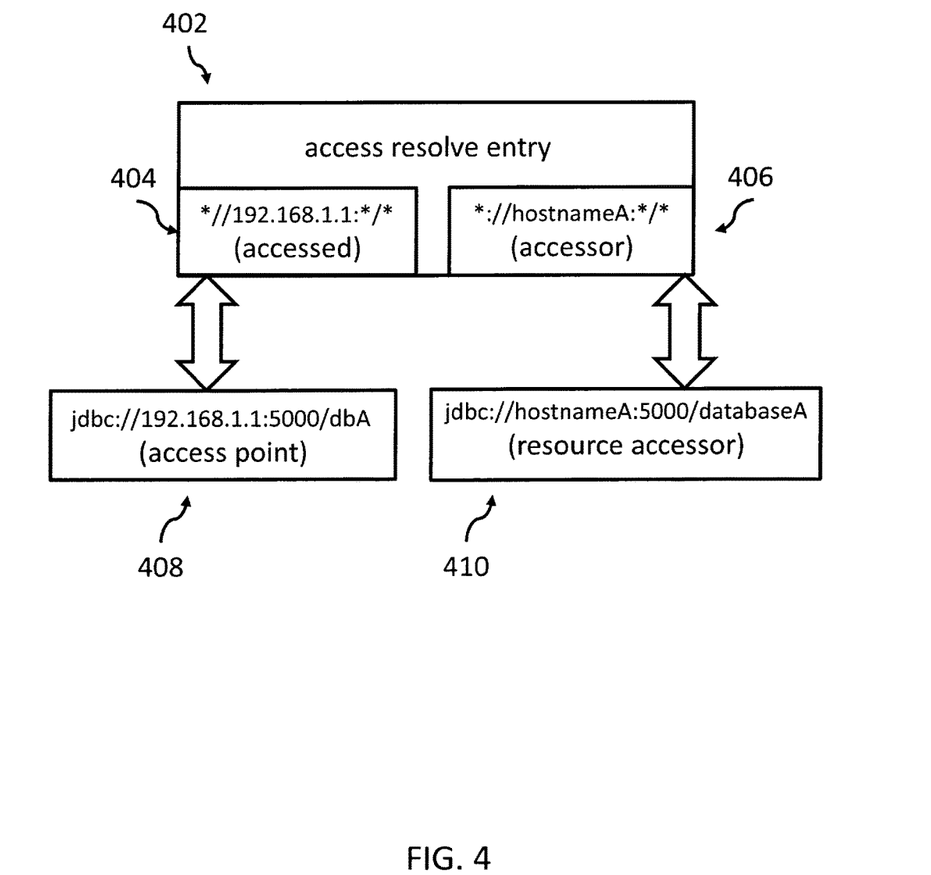
FIG. 4 shows an embodiment of an access resolve entry object, in accordance with an aspect of the present invention.

FIG. 4 shows an embodiment of an access resolve entry object 402. The access point 204 (compare FIG. 2) may be represented by box 408 also shown as an equivalent access resolve entry 404 with wildcards. On the other side, the resource accessor 202 may be represented here by box 410, shown specifying a hostname, in particular hostnameA, and a database, in particular databaseA. However, the related addresses of these objects are not given as numbers.

Therefore, the resource accessor 202, 410 represented by accessing URI-object 406—equivalent to the resource accessor address 206—and the access point 204, 4008 represented by accessed URI-object 404—equivalent to the access point address 208—are paired via an ARE table of the access resolve entry object 402. The pairing may be achieved via a matching, i.e., a comparison of the access resolve entry/URI-object 404 and the access resolve entry/URI-object 406.

Matching may take into account wildcards that may be provided as a part of any URI in a way wildcards are typically being used in conventional technologies of character and/or string matching.

The resolve access entries of the resolve access entry object 402 may represent, e.g., a DNS entry when the resource accessor 410 and access point 408 are configured such that one is using DNS entries and the other one is using IP addresses. Other examples may include load-balancer configurations, NAT (Network Access Translation) tables, etc.

As ARE-object 402, URI-objects 404, 406—either accessed or accessing—may comprise wildcards. AREs in ARE-objects 402 may be provided as more generic abstractions of, e.g., a connectivity protocol, than simple representations of the resource accessor 202 and/or access point 204, i.e., related data structures 210, 212. In case of a DNS configuration, the ARE may represent a connectivity protocol generic entry, i.e., a related URI may contain only the hostname part. But due to use of a wildcard within the protocol, it may be used in resolving, e.g., jdbc connectivity related dependencies.

The access resolve entry object 402 may be divided into two subcategories: Local$_{13}$ AccessResolveEntry (Local_ARE) and Global_AccessResolveEntry (Global_ARE).

In case of a Global_ARE—URIs of accessing and accessed objects are assumed to comprise all information required for matching an access point address 408, 208 respectively and a resource accessor address 410, 206 respectively (e.g., DNS entries).

Local_AREs are assumed to be used only to resolve URIs (of access points, resource accessors) which are referencing contextual CIs, which provide Local_ARE objects.

A Local_ARE may represent, e.g., a mapping from 0.0.0.0 or '*' listening configuration (which typically is interpreted as all available IP interfaces) provided by a software server instance configuration (e.g., an RDBMS server) to a list of available IP interfaces for an operating system (OS) (provided by the operating system configuration). In that case, a software server configuration may be read separately from the OS (operating system) configuration itself as long as a logic reading software server configuration is able to properly reference the OS CI (it does not need to reference a Local_ARE entry, so it does need to know only an OS identifier not the IP interfaces details, though).

Another example for a use case, wherein a Local_ARE is advantageous, is a JEE (Java Enterprise Edition) application deployment configuration. Typically, a JEE application itself is configured to not use external resources (e.g., jdbc) directly but via a container (i.e., an application server) exposing connectivity information to an application via jndi (Java Naming and Directory Interface). A Local_ARE can represent jndi to jdbc mapping, allowing logic which is reading a JEE application configuration (creates resource accessor) to be separated from the logic responsible to understand the application server configuration (creates Local_ARE).

In one embodiment, a JEE configuration is part of the standard while a configuration of the application server may be vendor specific and may typically require different logic to be applied to each vendor solution. Thus, it is possible to reuse the JEE configuration logic at any application server type and have different logic only for parsing the application server configuration.

It may be noted that an access resolve entry object may be provided as a software and/or information object as well as a storage unit comprising storage elements for storing the related addresses.

At this point, it is useful to describe the mechanism of how dependencies may be created in practice: A prerequisite is that configuration data providers (code plugins, different IT management software) are parsing configurations of owned systems and are creating proper entries like access point addresses 408, resource accessor addresses 410 and access resolve entries 402 in the CMDB.

The performed technique may then look like the following:

For each resource accessor address 206, 410 (RA), search for a matching URI (that can be directly the access point address 208, 408 or an access resolve entry object 402 accessed part).
  2. If a matching entry is found, perform:
  a. When being an access point address 208, 408 (AP).
    i. Obtain the CI providing the access point address 208, 408 (AP.providedBy).
    ii. Obtain the CI providing the resource accessor address 206, 410 (RA.providedBy).
    iii. Create a dependency between the obtained resources.
  b. When being AccessResolveEntry.acessed
    i. Obtain the paired ARE.access URI
    ii. Search for a matching URI (that can be directly an access point address 208, 408 or an AccessResolveEntry.accessed part)
    iii. If a matching entry is found, go to 2.

Figure 5:
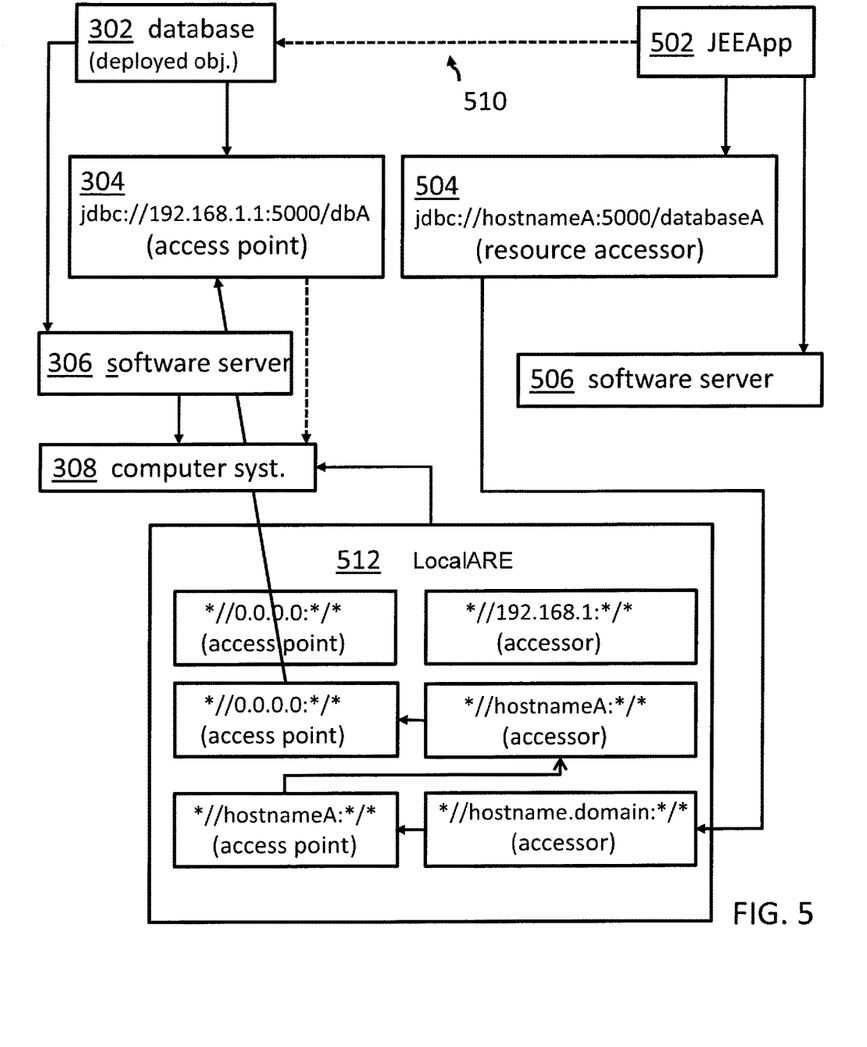
FIG. 5 shows an embodiment of one example of accesses and dependencies between CIs, in accordance with an aspect of the present invention.

Now, some examples may be considered:

FIG. 5 shows an embodiment of one example of accesses and dependencies between CIs: A Local_AccessResolveEntry object (Local_ARE) is used to resolve a JEEApp to database jdbc connectivity. The database server 306 may be configured to listen on all interfaces. This example refers back to FIG. 3 with the database 302, the URI-object 304, the software server 306 and the computer system 308.

On the other side, there is the JEE application 502 (JEEApp) with the corresponding URI-object 504 running on the software server 506. The dashed line 510 shows the access of the resource accessor JEE application 502 to the access point 204 (compare FIG. 2) being the database 302 (compare FIG. 3).

The address translation may be performed by the access resolve entry object Local_AccessResolveEntry (Local_ARE) 512—which corresponds to the access resolve entry object 402—from which a skilled person may recognize the access resolution.

Figure 6:
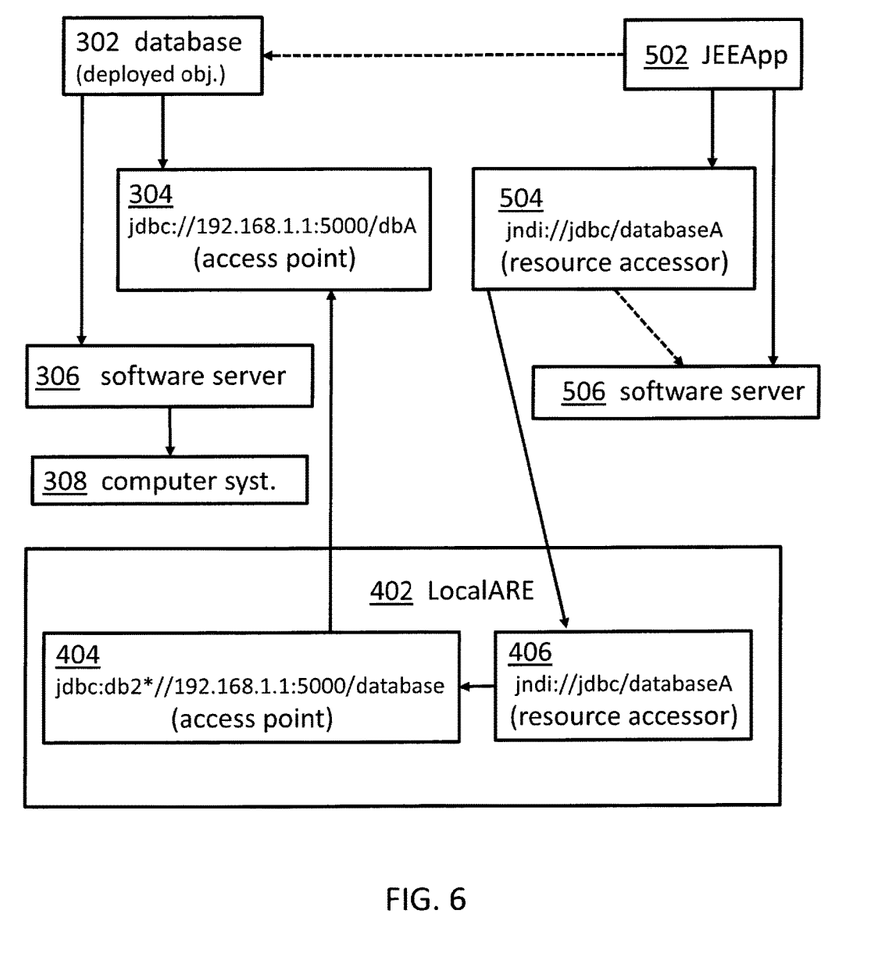
FIG. 6 shows an embodiment of another example of accesses and dependencies between CIs, in accordance with an aspect of the present invention.

FIG. 6 shows an embodiment of another example of accesses and dependencies between CIs: A JEE application 502 to database 302 jdbc based connectivity, wherein the JEE application 502 is configured via jndi (see above). In this case, the resource accessor URI-object 504 is using the scheme jndi, as can easily be recognized. In this case, the Local_AccessResolveEntry 402 comprises a 1:1 relation. No additional translation may be required.

Figure 7:
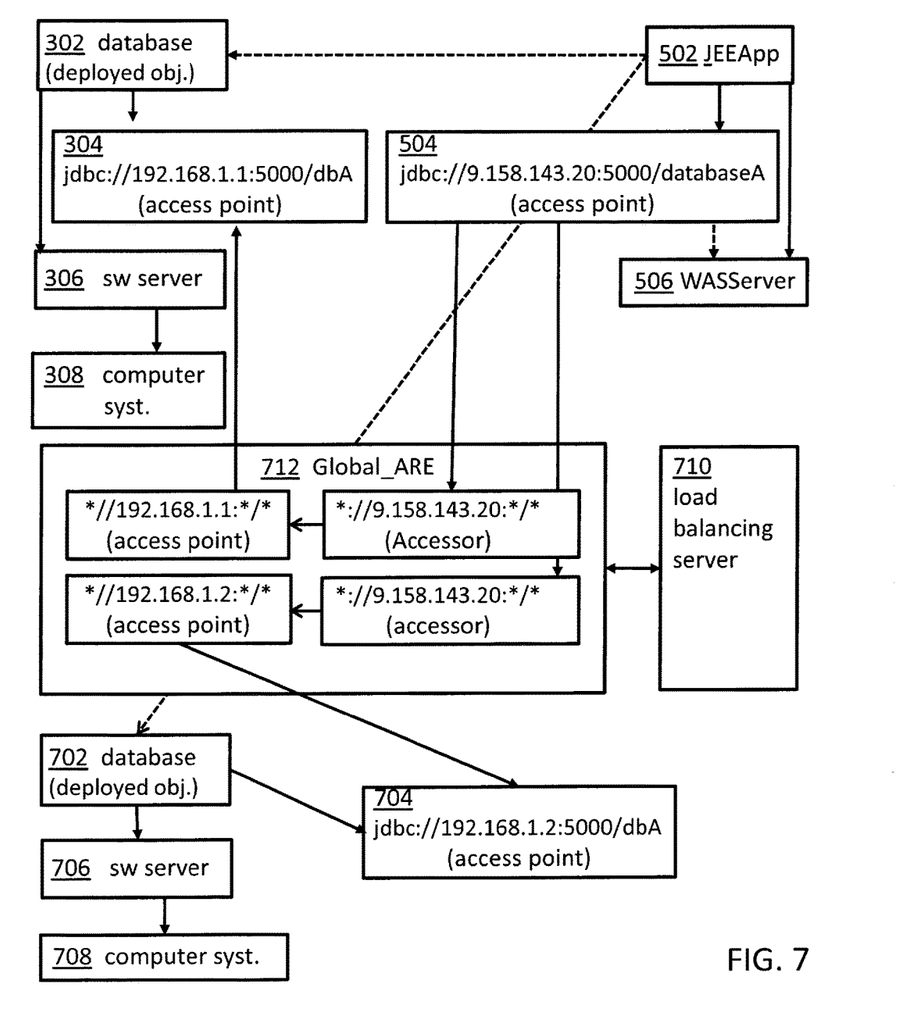
FIG. 7 shows an embodiment of yet another example of accesses and dependencies between CIs, in accordance with an aspect of the present invention.

FIG. 7 shows an embodiment of a further example of accesses and dependencies between CIs: A JEE application 502 to database 302 jdbc based connectivity with a load-balancer 710.

In this case, a second database 702 referenced by a second access point address 704 running on a second software server 706 being executed on a second computer system 708 is shown. The software servers 306 and 706 may be DB2 instances (DB2 is a database provided by International Business Machines Corporation, Armonk, N.Y.).

Additionally, a load-balancer 710 is shown which may be balancing distributing workloads from the JEE application 502 among the databases 302 and 702. The resolution of addresses of the Global_AccessResourceEntry (Global_ARE) 712 corresponding to the above mentioned access resolve entry object 402 may require two resolve entry table pairs: one for database 302 and another one for the database 702.

It may be noted that the software server 506 is shown as WASS server (Web Application Software Server).

Figure 8:
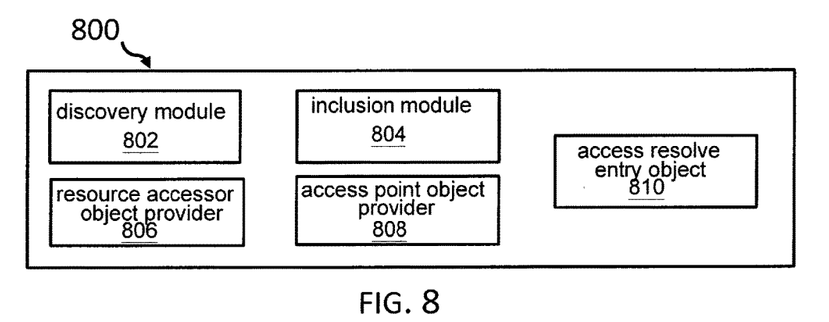
FIG. 8 shows an embodiment of a configuration item dependency generator, in accordance with an aspect of the present invention.

FIG. 8 shows an embodiment of the configuration item dependency generator 800 to discover and identify resource dependencies. The configuration item dependency generator includes—as shown, in one example—a discovery module 802 adapted to discover resources in a computing center and adapted to manage them as configuration items, wherein selected configuration items are each assigned a Uniform Resource Identifier object (URI-object) and an inclusion module 804 adapted to include the assigned URI-object of a configuration item to a configuration data structure of the related configuration item, and to store the configuration data structures in a configuration management system.

The generator 800 also includes, for instance, a resource accessor object provider 806 adapted to assign a resource accessor address in the form of a URI-object to a configuration item of a resource accessor. The resource accessor address defines an address in the form of a URI-object of a resource to be accessed. The generator 800 further includes, in one example, an access point object provider 808 adapted to assign an access point address in the form of a URI-object to a configuration item of an access point. The access point address may define an address in the form of a URI-object of the resource to be accessed. The generator additionally includes, for instance, an access resolve entry object 810 adapted to provide an access resolve entry object providing a function for address translations, wherein the access resolve entry object includes at least a part of the resource accessor address and at least a part of the access point address, each of them in a URI-object form.

As described herein, according to one aspect, a method for discovering and identifying resource dependencies may be provided. The method may comprise discovering resources in a computing center and managing them as configuration items, wherein selected configuration items may each be assigned a Uniform Resource Identifier object (URI-object). The method may also comprise including the assigned URI-object of a configuration item (CI), in particular, a plurality of CIs—to a configuration data structure of the related configuration item—in particular one configuration data structure for each CI—and storing the configuration data structure in a configuration management system.

Furthermore, the method may comprise assigning a resource accessor address in the form of a URI-object to a configuration item of a resource accessor, wherein the resource accessor address may define an address in the form of a URI-object of a resource to be accessed, and assigning an access point address in the form of a URI-object to a configuration item of an access point, wherein the access point address may define an address in the form of a URI-object of the resource to be accessed.

Additionally, the method may comprise providing an access resolve entry object providing a function for address translations, wherein the access resolve entry object may comprise at least a part of the resource accessor address and at least a part of the access point address, each of them in a URI-object form.

According to another aspect, a configuration item dependency generator for discovering and identifying indirect resource dependencies may be provided. The configuration item dependency generator may comprise a discovery module adapted for discovering resources in a computing center and adapted for managing them as configuration items, wherein selected configuration items may each be assigned a Uniform Resource Identifier object (URI-object).

The configuration item dependency generator may further comprise an inclusion module adapted for including the assigned URI-object of a configuration item to a configuration data structure of the related configuration item and adapted for storing the configuration data structure in a configuration management system.

Furthermore, the configuration item dependency generator may comprise a resource accessor object provider adapted for assigning a resource accessor address in the form of a URI-object to a configuration item of a resource accessor, wherein the resource accessor address may define an address in the form of a URI-object of a resource to be accessed, and an access point object provider adapted for assigning an access point address in the form of a URI-object to a configuration item of an access point, wherein the access point address may define an address in the form of a URI-object of the resource to be accessed.

Additionally, the configuration item dependency generator may comprise an access resolve entry object adapted for providing an access resolve entry object providing a function for address translations, wherein the access resolve entry object may comprise at least a part of the resource accessor address and at least a part of the access point address, each of them in a URI-object form.

It may be noted that the configuration management system may be a configuration management database, namely a CMDB.

Figure 9:
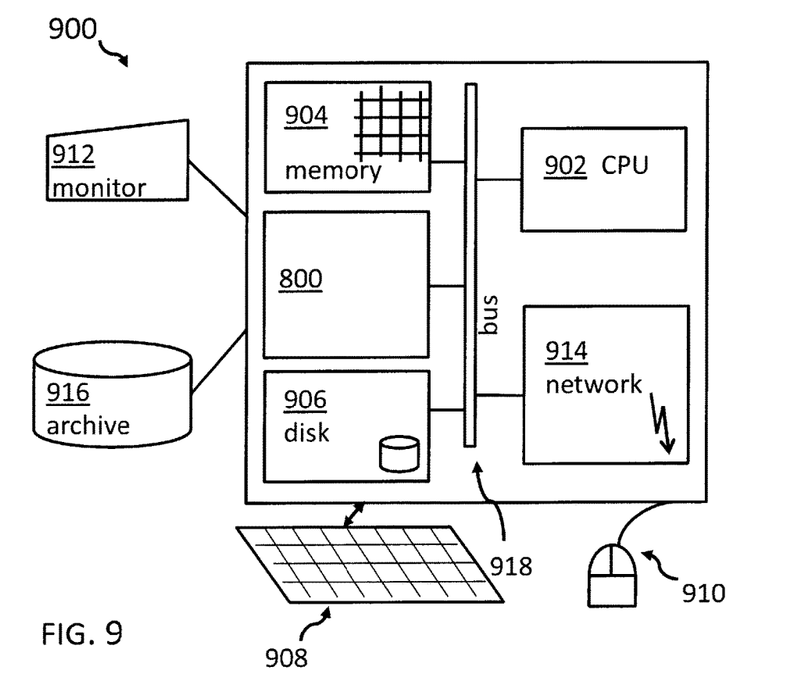
FIG. 9 shows an embodiment of a computer system comprising the configuration item dependency generator, in accordance with an aspect of the present invention.

Embodiments of the invention may be implemented together with virtually any type of computer, regardless of the platform being suitable for storing and/or executing program code. For example, as shown in FIG. 9, a computing system 900 may include one or more processor(s) 902 with one or more cores per processor, associated memory elements 904, an internal storage device 906 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 904 may include a main memory, e.g., a random access memory (RAM), employed during actual execution of the program code, and a cache memory, which may provide temporary storage of at least some program code and/or data in order to reduce the number of times code and/or data is to be retrieved from a long-term storage medium or external bulk storage 916 for an execution. Elements inside the computer 900 may be linked together by means of a bus system 918 with corresponding adapters. Additionally, the configuration item dependency generator 800 may be attached to the bus system 918.

The computing system 900 may also include input means such as a keyboard 908, a pointing device such as a mouse 910, or a microphone (not shown). Alternatively, the computing system may be equipped with a touch sensitive screen as a main input device. Furthermore, the computer 900, may include output means such as a monitor or screen 912 (e.g., a liquid crystal display (LCD), a plasma display, a light emitting diode display (LED), or cathode ray tube (CRT) monitor). The computer system 900 may be connected to a network (e.g., a local area network (LAN), a wide area network (WAN)), such as the Internet or any other similar type of network, including wireless networks via a network interface connection 914. This may allow a coupling to other computer systems, or a storage network, or a tape drive. Those skilled in the art will appreciate that many different types of computer systems exist, and the aforementioned input and output means may take other forms. Generally speaking, the computer system 900 may include at least the minimal processing, input and/or output means, necessary to practice embodiments of the invention.

While aspects of the invention have been described with respect to a limited number of embodiments, those skilled in the art, having benefit of this disclosure, will appreciate that other embodiments may be devised, which do not depart from the scope of aspects of the invention, as disclosed herein. Accordingly, the scope of aspects of the invention should be limited only by the claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit aspects of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims, if any, are intended to include any structure, material, or act for performing the function in combination with other claimed elements, as specifically claimed. The description of aspects of the present invention has been presented for purposes of illustration and description, but is not intended to be exhaustive or limited to the aspects in the form disclosed. Many modifications and variations will be apparent to those of ordinary skills in the art without departing from the scope and spirit of aspects of the invention. The embodiment was chosen and described in order to best explain the principles of aspects of the invention and the practical application, and to enable others of ordinary skills in the art to understand the aspects of the invention for various embodiments with various modifications, as are suited to the particular use contemplated.

What is claimed is:

1. A method of discovering and identifying resource dependencies, the method comprising:
    providing configuration information management within a computing environment, the providing comprising:
        discovering resources in the computing environment and managing the resources as configuration items, wherein selected configuration items are each assigned a Uniform Resource Identifier (URI)-object, and wherein the selected configuration items are only those of resources to be accessed;

providing respective configuration data structures for the selected configuration items including the assigned URI-object, and storing the configuration data structures in a configuration management system, each respective configuration data structure describing specific characteristics of the configuration item;

assigning, via the configuration management system, a resource accessor address in a form of a URI-object to a configuration item of a resource accessor, wherein the resource accessor address defines an address in the form of a URI-object of a resource to be accessed by the resource accessor, the resource accessor address being an address to be accessed as seen from the resource accessor;

assigning, via the configuration management system, an access point address in the form of a URI-object to a configuration item of an access point of the resource to be accessed, wherein the access point address defines an address in the form of a URI-object of the resource to be accessed, the access point address being an address as seen from the access point, where the resource accessor address and the access point address are different representations;

providing, via the configuration management system, an access resolve entry object providing a function for address translation, wherein the access resolve entry object comprises at least a part of the resource accessor address and at least a part of the access point address, each of them in the URI-object form;

identifying, from the access resolve entry object, a dependency between the configuration item of the resource accessor and the configuration item of the access point by comparing the at least part of the resource accessor address and the at least part of the access point address to match the CI representing the access point and the CI representing the resource accessor; and based on the identifying, storing in a repository of the computing environment the dependency between the configuration item of the resource accessor and the configuration item of the access point.

2. The method according to claim 1, wherein the URI-object is described according to RFC3986 of the Internet Engineering Task Force, and wherein the URI-object allows unspecified elements of the URI-object.

3. The method according to claim 1, wherein information about the resource available for access by the resource accessor is extracted from the configuration data structure of a configuration item and converted into the access point address in the URI-form.

4. The method according to claim 1, wherein information about a resource adapted to access another resource is extracted from the configuration data structure of a related configuration item and converted into the resource accessor address in the URI-form.

5. The method according to claim 1, wherein a set of the address resolution entry objects is linked to the access point address.

6. The method according to claim 5, wherein the linking of the address resolution entry objects to the access point address further comprises:

for each resource accessor address, searching for a matching URI-object in the set of access point addresses and the access resolve entry objects.

7. The method according to claim 6, wherein for each matching URI-object, based on the matching URI-object representing an access point address:

the configuration item of the corresponding accessed resource is obtained;

the configuration item of the accessing resource is obtained; and a dependency is generated between the related configuration items.

8. The method according to claim 7, further comprising:

based on the matching URI-object representing an access resolve entry object that is accessed, a related access resolve entry object is obtained; and a matching URI-object is searched in the set of access point addresses and the access resolve entry objects.

9. The method according to claim 1, wherein at least one of the resource accessor or the access point is each selected out of the group comprising a hardware object and a software object.

10. A computer program product for discovering and identifying resource dependencies, the computer program product comprising:

a non-transitory computer readable storage medium readable by a processing circuit and storing instructions for execution by the processing circuit for performing a method comprising:

providing configuration information management within a computing environment, the providing comprising:

discovering resources in the computing environment and managing the resources as configuration items, wherein selected configuration items are each assigned a Uniform Resource Identifier (URI)-object, and wherein the selected configuration items are only those of resources to be accessed;

providing respective configuration data structures for the selected configuration items including the assigned URI-object, and storing the configuration data structures in a configuration management system, each respective configuration data structure describing specific characteristics of the configuration item;

assigning, via the configuration management system, a resource accessor address in a form of a URI-object to a configuration item of a resource accessor, wherein the resource accessor address defines an address in the form of a URI-object of a resource to be accessed by the resource accessor, the resource accessor address being an address to be accessed as seen from the resource accessor;

assigning, via the configuration management system, an access point address in the form of a URI-object to a configuration item of an access point of the resource to be accessed, wherein the access point address defines an address in the form of a URI-object of the resource to be accessed, the access point address being an address as seen from the access point, where the resource accessor address and the access point address are different representations;

providing, via the configuration management system, an access resolve entry object providing a function for address translation, wherein the access resolve entry object comprises at least a part of the resource accessor address and at least a part of the access point address, each of them in the URI-object form;

identifying, from the access resolve entry object, a dependency between the configuration item of the resource accessor and the configuration item of the access point by comparing the at least part of the resource accessor address and the at least part of the access point address to match the CI representing the access point and the CI representing the resource accessor; and based on the identifying, storing in a repository of the computing environment the dependency between the configuration item of the resource accessor and the configuration item of the access point.

11. The computer program product according to claim 10, wherein information about a resource adapted to access another resource is extracted from the configuration data structure of a related configuration item and converted into the resource accessor address in the URI-form.

12. The computer program product according to claim 10, wherein a set of the address resolution entry objects is linked to the access point address.

13. The computer program product according to claim 12, wherein the linking of the address resolution entry objects to the access point address further comprises:

for each resource accessor address, searching for a matching URI-object in the set of access point addresses and the access resolve entry objects.

14. The computer program product according to claim 13, wherein for each matching URI-object, based on the matching URI-object representing an access point address:

the configuration item of the corresponding accessed resource is obtained;

the configuration item of the accessing resource is obtained; and a dependency is generated between the related configuration items.

15. The computer program product according to claim 14, wherein the method further comprises:

based on the matching URI-object representing an access resolve entry object that is accessed, a related access resolve entry object is obtained; and a matching URI-object is searched in the set of access point addresses and the access resolve entry objects.

16. A computer system for discovering and identifying resource dependencies, the computer system comprising:

a memory; and a processor in communications with the memory, wherein the computer system is configured to perform a method, said method comprising:

providing configuration information management within a computing environment, the providing comprising:

discovering resources in the computing environment and managing the resources as configuration items, wherein selected configuration items are each assigned a Uniform Resource Identifier (URI)-object, and wherein the selected configuration items are only those of resources to be accessed;

providing respective configuration data structures for the selected configuration items including the assigned URI-object, and storing the configuration data structures in a configuration management system, each respective configuration data structure describing specific characteristics of the configuration item;

assigning, via the configuration management system, a resource accessor address in a form of a URI-object to a configuration item of a resource accessor, wherein the resource accessor address defines an address in the form of a URI-object of a resource to be accessed by the resource accessor, the resource accessor address being an address to be accessed as seen from the resource accessor;

assigning, via the configuration management system, an access point address in the form of a URI-object to a configuration item of an access point of the resource to be accessed, wherein the access point address defines an address in the form of a URI-object of the resource to be accessed, the access point address being an address as seen from the access point, where the resource accessor address and the access point address are different representations;

providing, via the configuration management system, an access resolve entry object providing a function for address translation, wherein the access resolve entry object comprises at least a part of the resource accessor address and at least a part of the access point address, each of them in the URI-object form;

identifying, from the access resolve entry object, a dependency between the configuration item of the resource accessor and the configuration item of the access point by comparing the at least part of the resource accessor address and the at least part of the access point address to match the CI representing the access point and the CI representing the resource accessor; and based on the identifying, storing in a repository of the computing environment the dependency between the configuration item of the resource accessor and the configuration item of the access point.

17. The computer system according to claim 16, wherein information about a resource adapted to access another resource is extracted from the configuration data structure of a related configuration item and converted into the resource accessor address in the URI-form.

18. The computer system according to claim 16, wherein a set of the address resolution entry objects is linked to the access point address.

19. The computer system according to claim 18, wherein the linking of the address resolution entry objects to the access point address further comprises:

for each resource accessor address, searching for a matching URI-object in the set of access point addresses and the access resolve entry objects.

20. The computer system according to claim 19, wherein for each matching URI-object, based on the matching URI-object representing an access point address:

the configuration item of the corresponding accessed resource is obtained;

the configuration item of the accessing resource is obtained; and a dependency is generated between the related configuration items.

* * * * *